(12) United States Patent
Sorin et al.

(10) Patent No.: US 6,548,801 B1
(45) Date of Patent: Apr. 15, 2003

(54) SYSTEM AND METHOD FOR OPTICAL HETERODYNE DETECTION OF AN OPTICAL SIGNAL

(75) Inventors: Wayne V. Sorin, Mountain View, CA (US); Douglas M. Baney, Los Altos, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/483,177

(22) Filed: Jan. 13, 2000

(51) Int. Cl.[7] ................................................. H01J 40/14
(52) U.S. Cl. .................... 250/214 R; 356/484; 359/191; 250/225
(58) Field of Search .............................. 250/214 R, 225, 250/227.23, 227.24; 359/191–193; 356/73.1, 479, 484, 487

(56) References Cited

U.S. PATENT DOCUMENTS

| | | | |
|---|---|---|---|
| 5,003,626 A | * 3/1991 | Kuwahara et al. | 359/192 |
| 5,060,312 A | * 10/1991 | Delavaux | 359/192 |
| 5,093,563 A | * 3/1992 | Small et al. | 250/201.9 |
| 5,202,745 A | 4/1993 | Sorin et al. | 356/73.1 |
| 5,268,741 A | 12/1993 | Chou et al. | 356/351 |
| 5,477,369 A | 12/1995 | Mahon et al. | 359/189 |
| 5,631,760 A | * 5/1997 | Heidemann | 359/191 |
| 5,663,793 A | * 9/1997 | De Groot | 356/491 |

* cited by examiner

*Primary Examiner*—Que T. Le
*Assistant Examiner*—Thanh X. Luu (57) ABSTRACT

An optical heterodyne detection system includes an input signal and a local oscillator signal that are combined in an optical coupler and output as a first beam and a second beam. A polarizing beam splitter is optically connected to the optical coupler in order to receive the first beam and the second beam. The polarizing beam splitter includes four outputs for outputting four beams to four photodetectors including two polarized portions of the first beam and two polarized portions of the second beam. The four photodetectors generate four electrical signals in response to respective ones of the four beams. The four electrical signals are transmitted to a processor and processed to provide an output response that is independent of the polarization state of the original input signal and in which the intensity noise has been suppressed. Processing of the electrical signals to suppress the intensity noise involves canceling the intensity noise component of similarly polarized beams by subtracting the similarly polarized beams. Processing of the electrical signals to provide polarization independence involves squaring the values generated from the two subtraction operations, low pass filtering the values generated from the two squaring operations, and then adding the values generated from the two filtering operations.

25 Claims, 5 Drawing Sheets

SYSTEM AND METHOD FOR OPTICAL HETERODYNE DETECTION OF AN OPTICAL SIGNAL

FIELD OF THE INVENTION

The invention relates generally to the field to optical measurements and measuring systems, and more particularly to a system and method for optical heterodyne detection of an optical signal.

BACKGROUND OF THE INVENTION

Figure 1:
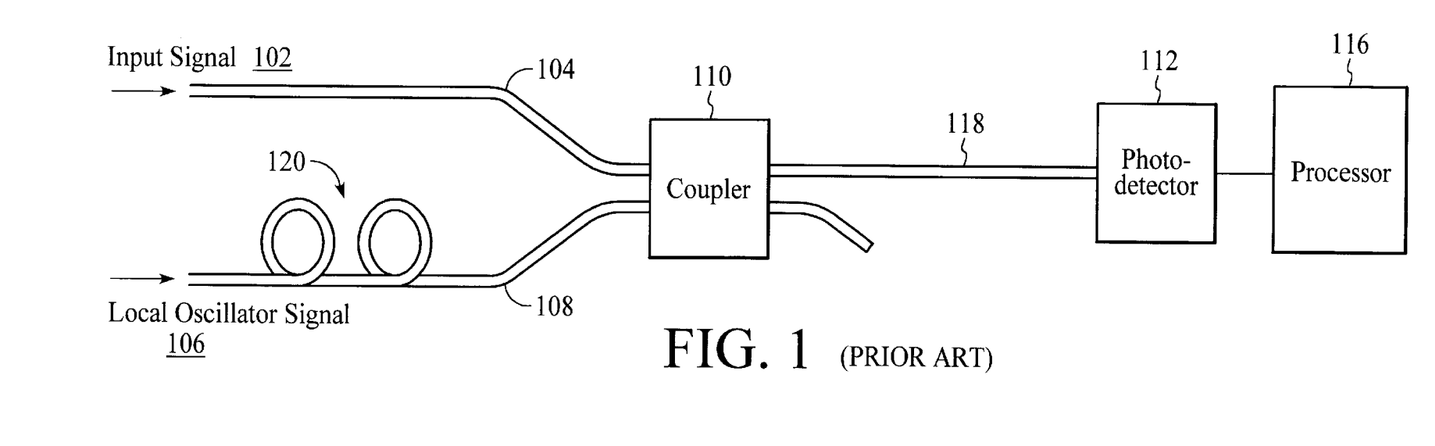
FIG. 1 is a depiction of an optical heterodyne detection system that includes a single photodetector, in accordance with the prior art.

Optical heterodyne detection systems are utilized to analyze an optical signal. FIG. 1 is a depiction of a prior art optical heterodyne detection system that includes an optical coupler 110 that combines an input signal 102 from an input fiber 104 with a local oscillator signal 106 from a local oscillator fiber 108. The combined optical signal travels on an output fiber 118 and is detected by a photodetector 112. The photodetector converts optical radiation from the combined optical signal into an electrical signal. The electrical signal is processed by a signal processor 116 to determine characteristics of the input signal, such as wavelength and amplitude. In order to optimize optical heterodyne detection, it is important that the polarization of the input signal and the local oscillator signal are matched. In order to match the polarization of the local oscillator signal to the polarization of the input signal, the local oscillator signal includes a polarization controller 120 as indicated by the two loops in the local oscillator optical fiber. A disadvantage of the optical heterodyne detection system of FIG. 1 is that detection of the input signal is highly dependent on the polarization of the input signal.

Figure 2:
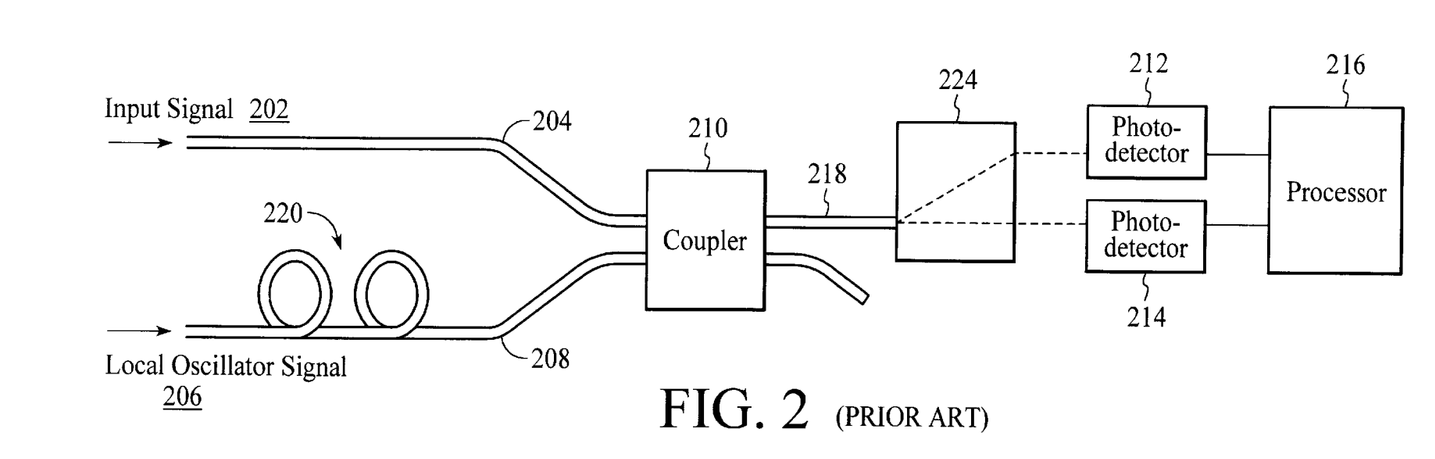
FIG. 2 is a depiction of an optical heterodyne detection system that includes a polarization diversity receiver, in accordance with the prior art.

A polarization diversity receiver can be incorporated into an optical heterodyne detection system to provide polarization independent signal detection. FIG. 2 is a depiction of an optical heterodyne detection system that incorporates a polarization diversity receiver. Throughout the specification, similar elements are identified by similar element numbers. The optical heterodyne detection system includes a polarization controller 220 on the local oscillator fiber 208, an optical coupler 210, a polarizing beam splitter 224, two photodetectors 212 and 214, and a processor 216. The polarizing beam splitter splits the combined optical signal into two polarized beams that are separately detected by the respective photodetectors. The polarized beams that are detected by the two photodetectors include an intensity noise component and a heterodyne component, as is known in the field of optical heterodyne detection. The heterodyne components of the polarized beams are utilized to determine the desired characteristics of the input optical signal, such as wavelength and amplitude.

Processing of the electrical signals generated by the two photodetectors 212 and 214 involves squaring the electrical signals generated from the two polarized beams, low pass filtering the squared terms, and then adding the filtered terms together. Although the polarization diversity receiver provides polarization independent signal detection, the polarization diversity receiver does not provide a way to separate the intensity noise components from the heterodyne components of the combined optical signal. In order to improve the performance of heterodyne detection systems with regard to parameters such as sensitivity and dynamic range, it is necessary to be able to clearly distinguish the heterodyne components from the intensity noise components of the combined optical signal that includes the input signal and the local oscillator signal.

In view of the prior art limitations, what is needed is an optical heterodyne detection system that provides polarization independence and intensity noise suppression.

SUMMARY OF THE INVENTION

A system and method for optical heterodyne detection of an optical signal includes an optical coupler and a polarizing beam splitter that split a combined input signal and local oscillator signal into four polarized beams. The four polarized beams are detected by four photodetectors that generate four different electrical signals in response to the four polarized beams. The four electrical signals are then processed to provide an output response that is independent of the polarization state of the original input signal and in which the intensity noise has been suppressed. Processing of the electrical signals to suppress the intensity noise involves canceling the intensity noise component of similarly polarized beams by subtracting signals related to the similarly polarized beams. Processing of the electrical signals to provide polarization diversity involves squaring the value generated from the two subtraction operations, low pass filtering the squared values, and then adding the filtered values together.

An embodiment of an optical heterodyne detection system includes an input signal and a local oscillator signal that are combined in an optical coupler to create a combined optical signal. The optical coupler includes two outputs for outputting a first beam and a second beam of the combined optical signal. A polarizing beam splitter is optically connected to the optical coupler in order to receive the first beam and the second beam. The polarizing beam splitter includes four outputs for outputting four beams including two polarized portions of the first beam and two polarized portions of the second beam. Four photodetectors are optically connected to the polarizing beam splitter to receive a different one of the four beams. The four photodetectors generate four electrical signals in response to respective ones of the four beams.

In an embodiment, the first photodetector corresponds to an ordinary portion of the first beam and the second photodetector corresponds to an extraordinary portion of the first beam. The third photodetector corresponds to an ordinary portion of the second beam and the fourth photodetector corresponds to an extraordinary portion of the second beam. In order to suppress intensity noise related to the four beams, the system further includes a processor for subtracting an electrical signal generated from the first photodetector from an electrical signal generated from the third photodetector, thereby creating a first subtracted signal, and for subtracting an electrical signal generated from the second photodetector from an electrical signal generated from the fourth photodetector, thereby creating a second subtracted signal.

In order to create an output signal that is independent of the polarization of the original input signal, the processor squares the first subtracted signal, thereby creating a first squared signal, squares the second subtracted signal, thereby creating a second squared signal, filters the first and second squared values with low pass filtering, thereby creating first and second filtered signals, and then adds the first filtered signal to the second filtered signal.

Before utilizing the system to measure an input signal it may be necessary to calibrate the system. A switch may be included with the system to block the input signal so that the optical coupler, the polarizing beam splitter, and the responsivity of the photodetectors can be calibrated.

A method for monitoring an optical signal utilizing optical heterodyne detection involves combining an input signal with a local oscillator signal and outputting a first beam and a second beam of the combined optical signal. The first beam is split into a first split beam having a first polarization state and into a second split beam having a second polarization state. The second beam is split into a third split beam having the first polarization state and into a fourth split beam having the second polarization state. The first split beam is detected and a first electrical signal is generated in response to the first split beam. The second split beam is detected and a second electrical signal is generated in response to the second split beam. The third split beam is detected and a third electrical signal is generated in response to the third split beam. The fourth split beam is detected and a fourth electrical signal is generated in response to the fourth split beam. The first, second, third, and fourth electrical signals are processed in order to suppress the intensity noise components of the four beams and to achieve polarization independence.

In an embodiment, the processing involves subtracting the first electrical signal from the third electrical signal in order to suppress intensity noise, thereby creating a first subtracted signal, subtracting the second electrical signal from the fourth electrical signal in order to suppress intensity noise, thereby creating a second subtracted signal, squaring the first subtracted signal, thereby creating a first squared signal, squaring the second subtracted signal, thereby creating a second squared signal, low pass filtering the first and second squared signals, thereby creating first and second filtered signals, and adding the first filtered signal to the second filtered signal in order to achieve polarization independence.

The optical heterodyne detection system and method provide an optical measurement system that is accurate over a wide range of wavelengths. The optical heterodyne detection system and method can be utilized as an optical spectrum analyzer to characterize an unknown input signal. The optical heterodyne detection system and method may also be utilized as an optical network analyzer in which a known signal is input into an optical network and the output signal is measured by the detection system.

Other aspects and advantages of the present invention will become apparent from the following detailed description, taken in conjunction with the accompanying drawings, illustrating by way of example the principles of the invention.

DETAILED DESCRIPTION OF THE INVENTION

Figure 3:
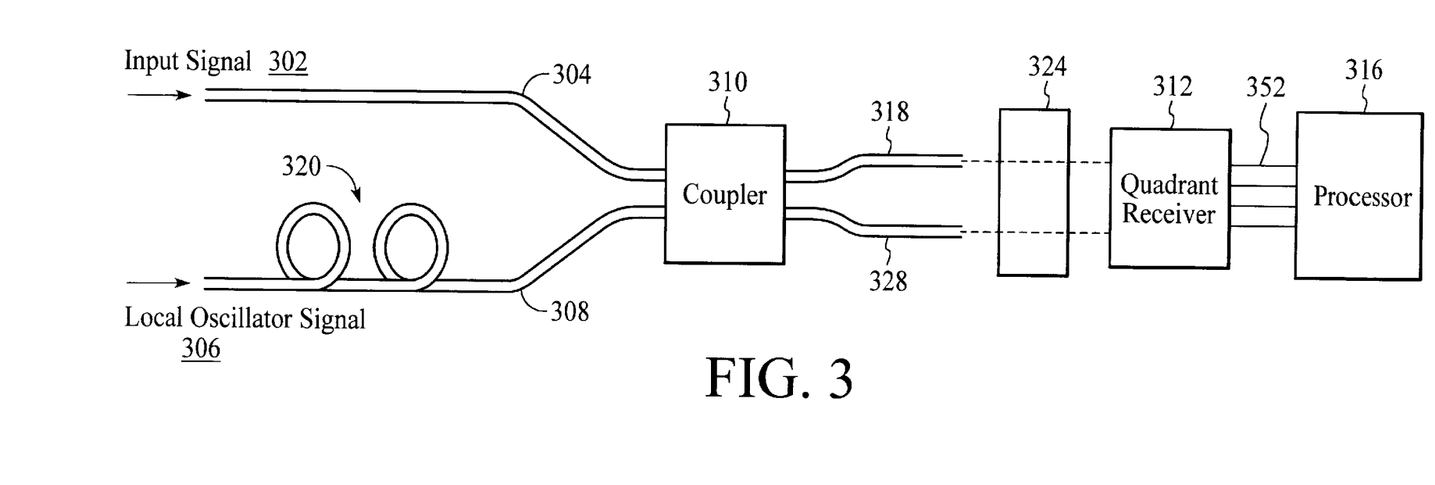
FIG. 3 is a top view of an optical heterodyne detection system that includes a polarizing beam splitter and a quadrant receiver, in accordance with the invention.

FIG. 3 is a top view of an optical heterodyne detection system that includes an input signal 302, a signal fiber 304, a local oscillator signal 306, a local oscillator fiber 308, an optical coupler 310, a polarizing beam splitter 324, a quadrant receiver 312, and a processor 316.

The input signal 302 and the local oscillator signal 306 include optical signals that are generated from conventional devices as is known in the field of optical communications systems. For example, the input signal and the local oscillator signal may be generated from lasers. The input signal may consist of a single wavelength or the input signal may include multiple wavelengths as is known in the field of wavelength division multiplexing. The input signal may be an optical signal having unknown optical characteristics, in which case the optical heterodyne detection system can be utilized for optical spectrum analysis. The signal may alternatively be an optical signal that is input with known optical characteristics, in which case the optical heterodyne detection system can be utilized for optical network analysis. Preferably, the local oscillator signal is a widely tunable optical signal generated from a wideband tunable laser. For example, the local oscillator signal may be tunable over a range of one nanometer or greater. During input signal detection, the local oscillator signal is typically swept across a wavelength range in order to detect the input signal.

The signal fiber 304 carries the input signal, or signals, that are to be detected by the system. In an embodiment, the signal fiber is a single mode optical fiber as is known in the art, although other optical waveguides may be utilized. In addition, although waveguides are described, optical signals may be input into the system, or transmitted within the system, in free space.

The local oscillator fiber 308 is an optical fiber, such as a single mode optical fiber, that carries the local oscillator signal. The local oscillator fiber may include a polarization controller 320 that controls the polarization state of the local oscillator signal. Other optical waveguides may be utilized in place of single mode optical fiber, such as polarization preserving fiber. Alternatively, the local oscillator signal may be transmitted through free space without the use of a waveguide.

The optical coupler 310 combines the input signal and the local oscillator signal onto common waveguides. As shown in FIG. 3, the optical coupler combines the input signal and the local oscillator signal and distributes the combined optical signal into two output fibers 318 and 328. In an embodiment, the input signal and the local oscillator signal are combined in a manner that ensures the spatial overlap of the input signal and the local oscillator signal, thereby causing full interference between the input signal and the local oscillator signal. The power distribution of the input signal and local oscillator signal between the two output fibers is influenced by the optical coupler and can be controlled to accomplish the desired power distribution. In an embodiment, the power of the combined optical signal is distributed approximately evenly between the two output fibers.

The optical coupler 310 may be an optically directional 3 dB fiber coupler, although other optical couplers may be utilized. In an embodiment, the optical coupler is substantially independent of the polarization of optical signals. In an embodiment, the optical coupler does not polarize the combined optical signal. The two output fibers 318 and 328 connected to the optical coupler carry the combined optical signal to the polarizing beam splitter. In an embodiment, the length of the two output fibers is chosen to provide sufficient attenuation of any cladding modes before the light of the input signal or the local oscillator signal reaches the end of either output fiber. For example, the length of the two output fibers should be chosen such that cladding mode light accounts for less than one percent of the total light emitted from each output fiber.

The polarizing beam splitter 324 separates an incoming optical beam into two polarized beams. The polarizing beam splitter may include, for example, a birefringent crystal that provides polarization walk-off, such as a rutile walk-off crystal. As will be described below, the polarizing beam splitter separates each of the combined optical signal beams into two beams having different polarization states. Preferably, the polarizing beam splitter separates each of the incoming beams into two linearly polarized components that have orthogonal directions of polarization. Although the polarizing beam splitter is described as a single device, the polarizing beam splitter may include multiple beam splitters in configurations that accomplish the task of splitting an incoming beam based on beam polarization. In addition, although the optical coupler and the polarizing beam splitter are shown as physically separate devices connected by optical fibers, the optical coupler and polarizing beam splitter may be integrated into a planar waveguide circuit that does not require optical fiber connections. It should be understood that other polarizing beam splitters may be utilized.

Figure 4:
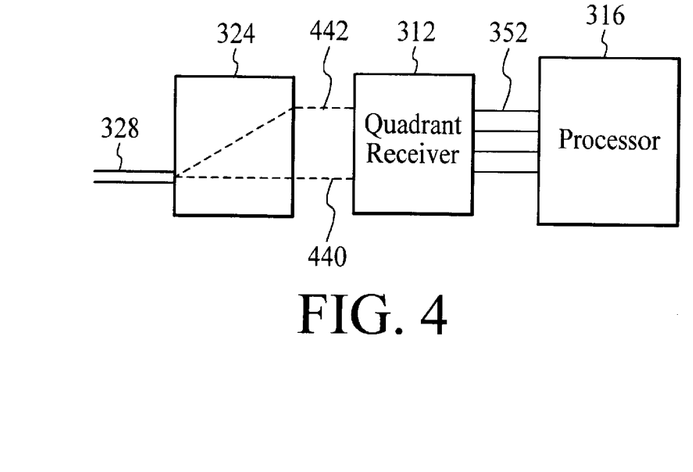
FIG. 4 is a side view of the optical heterodyne detection system of FIG. 3 that includes the polarizing beam splitter and the quadrant receiver, in accordance with the invention.

FIG. 4 is a side view of the polarizing beam splitter 324, the quadrant receiver 312, and the processor 316. FIG. 4 shows how the two beams of the combined optical signal are split into two differently polarized beams, as identified by the dashed lines 440 and 442. As shown in FIG. 4, the bottom beam 440 follows an "ordinary" path and is referred to as the ordinary beam. The top beam 442 walks off in an "extraordinary" path and is referred to as the extraordinary beam.

In an embodiment, the polarization of the local oscillator signal is controlled such that the power of the local oscillator signal is distributed approximately evenly among the four quadrants of the quadrant receiver 312.

The quadrant receiver 312 includes four independent photodetectors that are aligned to separately detect the four polarized beams that are output from the polarizing beam splitter 324. The four independent photodetectors are combined into a single unit for packaging reasons, however, the four independent photodetectors could alternatively be, for example, four photodetectors that are physically separate. Although not shown, the receiver may include signal amplifiers and filters, as is known in the field.

Figure 5:
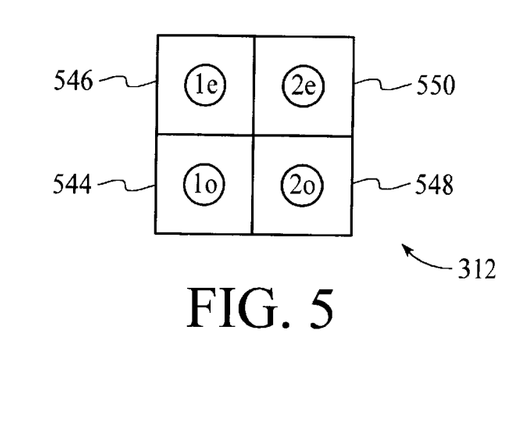
FIG. 5 is a front view of the quadrant receiver as shown in FIGS. 3 and 4, in accordance with the invention.

FIG. 5 is a front view of an embodiment of the quadrant receiver 312 shown in FIGS. 3 and 4 that includes four photodetectors 544, 546, 548, 550. As shown in FIG. 5, the two left photodetectors 544 and 546 of the receiver are partially identified by "1," which corresponds to the beam (beam 1) that is output from the first output fiber 318 of the optical coupler 310. The two right photodetectors 548 and 550 are partially identified by the number "2," which corresponds to the beam (beam 2) that is output from the second output fiber 328 of the optical coupler. The two bottom photodetectors 544 and 548 are partially identified by the letter "o," which corresponds to the ordinary beams exiting from the polarizing beam splitter. The two top photodetectors 546 and 550 are partially identified by the letter "e," which corresponds to the extraordinary beams exiting from the polarizing beam splitter. Under this convention, the four beams and the respective photodetectors are identified as "1o," "1e," "2o," and "2e."

The electrical signals generated by each of the four photodetectors 544, 546, 548, and 550 in the quadrant receiver 312 are individually provided to the processor 316. The four connections between the quadrant receiver and the processor are depicted in FIGS. 3 and 4 by four lines 352.

The processor 316 receives the electrical signals from the quadrant receiver 312 and processes the electrical signals into useful data. The processor may include analog signal processing circuitry and/or digital signal processing circuitry. In an embodiment, analog signals from the receiver are converted into digital signals and the digital signals are subsequently processed as described below with reference to FIG. 6. It should be understood that digital signal processing involves converting the electrical signals from the photodetector into digital signals that are representative of the original electrical signals.

Operation of the system described with reference to FIGS. 3–5 involves combining an input signal and a swept local oscillator signal in the optical coupler 310. The combined optical signal is then split into two beams that each include a portion of the input signal and the local oscillator signal. Each of the two beams containing the combined optical signal is then split by the polarizing beam splitter 324 into two polarized beams having different polarization states. The polarized beams are then detected by the quadrant receiver 312 and each of the four photodetectors 544, 546, 548, and 550 within the receiver generates electrical signals in proportion to the intensity of the optical beams that are detected. The electrical signals generated by the four photodetectors are then received by the processor 316 and processed in a manner that isolates and maximizes the heterodyne term of the combined optical signal. Processing of the electrical signals involves providing intensity noise suppression and polarization diversity. As is described below, the system may require an initial calibration operation in order to provide accurate results.

Figure 6:
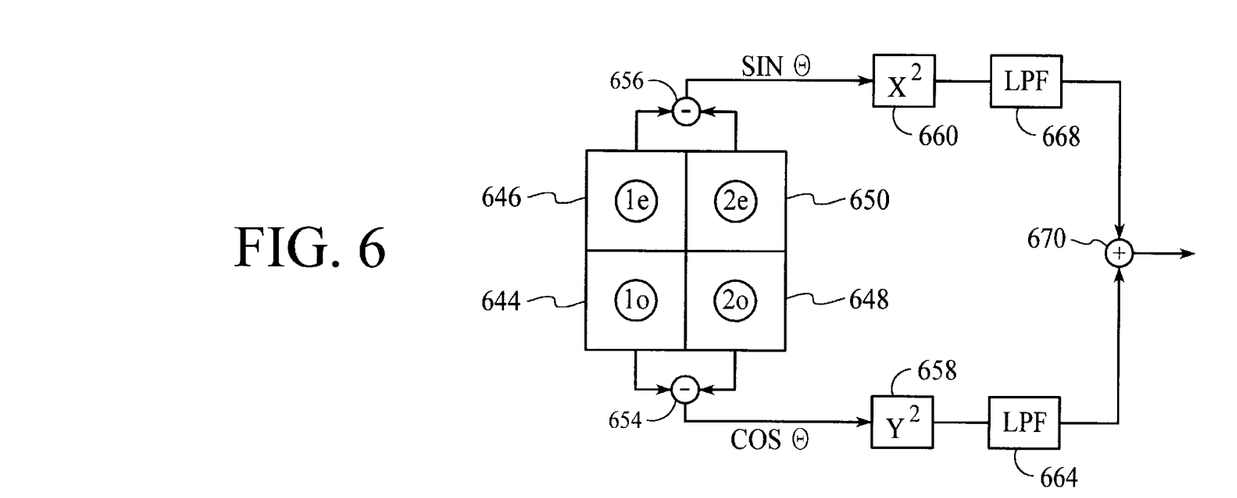
FIG. 6 is a graphical depiction of the signal processing that is performed on the electrical signals that are generated from the quadrant receiver of FIG. 5, in accordance with the invention.

FIG. 6 is an example graphical depiction of how the electrical signals generated from the four photodetectors 644, 646, 648, and 650 in response to the combined optical signal are processed to achieve intensity noise suppression and polarization diversity. As described above, the signal processing preferably involves digital signal processing although this is not critical. Initially, signal subtractions are performed between the "1o" signal and the "2o" signal, and between the "1e" signal and the "2e" signal. The subtraction functions are represented by subtraction units 654 and 656, respectively. The subtraction functions are performed to provide intensity noise suppression by canceling out the intensity noise components of the optical signals that are received by each photodetector. The subtraction functions cancel out the intensity noise because the intensity noise is common between each signal. That is, the amplitudes of the "1e" and "2e" signals fluctuate in a synchronized manner and by the same percentage relative to each other, and the "1o" and "2o" signals fluctuate in a synchronized manner and by the same percentage relative to each other.

Additional signal processing is implemented on the subtracted signals to provide polarization diversity. Because the combined optical signal beams are split into orthogonal states of polarization, one of the beams is proportional to cos θ and the other beam is proportional to sin θ, where θ is the angle of polarization of the input signal. In the example of FIG. 6, the electrical signals generated from the ordinary beam portions include a cos θ term and the electrical signals generated from the extraordinary beam portions include a sin θ term. The cos θ term is squared, as represented by squaring unit 658, and the sin θ term is squared, as represented by squaring unit 660. The squaring units generate output signals that are proportional to the square of the input signals. The output signals from the squaring units are each connected to low pass filtering units 664 and 668. The low pass filtering units provide low pass filtering on the squared output signals. The output signals from the low pass filtering units are each connected to an input terminal of an adder unit, designated 670, which produces a readout signal that is proportional to the sum of the signals from the low pass filtering units. Squaring the cos θ term and the sin θ term, low pass filtering the terms, and then adding the squared and filtered cos θ term to the squared and filtered sin θ term provides a result that is independent of the angle of polarization (θ) of the input signal and therefore polarization diverse. It should be understood that in a digital system the subtracting, squaring, low pass filtering, and adding units may be incorporated into a multi-function processor.

The combination of the polarizing beam splitter 324, the quadrant receiver 312, the processor 316, and the signal processing units 654, 656, 658, 660, 664, 668, and 670 creates a system that is insensitive to the polarization state of the input signal and that suppresses the intensity noise of the split beams that are detected by the four photodetectors.

Figure 7:
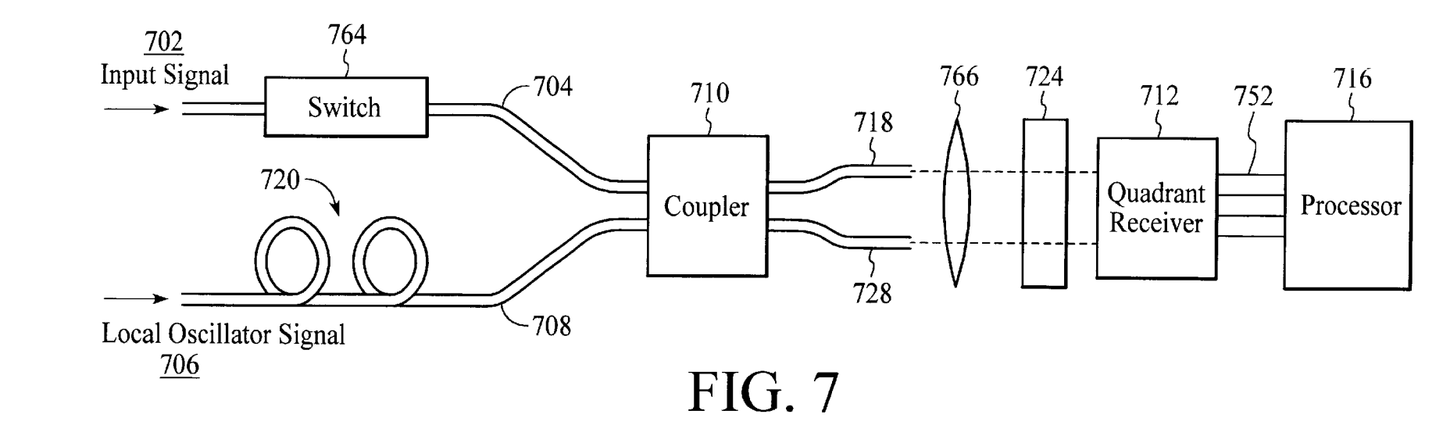
FIG. 7 is a top view of an optical heterodyne detection system similar to the optical heterodyne detection system of FIGS. 3 and 4 that includes a switch and a lens, in accordance with the invention.

FIG. 7 is a depiction of an embodiment of an optical heterodyne detection system that is similar to the system that is described with reference to FIGS. 3–6. The system of FIG. 7 includes a switch 764 associated with the signal fiber 704 and a lens 766 located between the two output fibers 718 and 728 and the polarizing beam splitter 724. The lens is utilized to direct the light beams from the output fibers to the polarizing beam splitter and eventually to the quadrant receiver 712. Although a single lens is shown, multiple lenses, such as fiber specific lenses, may be utilized.

The switch 764 is utilized to selectively block transmission of the input signal in order to calibrate the system. For example, while the input signal is switched off, the coupling coefficient of the coupler can be determined as a function of wavelength by sweeping the local oscillator signal across a range of wavelengths. In addition, the responsivity of the photodetectors can be determined as a function of wavelength by sweeping the local oscillator signal while the input signal is switched off.

Further, the distribution of the local oscillator signal onto the photodetectors can be determined as a function of wavelength by sweeping the local oscillator signal while the input signal is switched off. It is preferable that the local oscillator signal is approximately evenly distributed among the four photodetectors of the receiver. If the local oscillator signal is not evenly distributed among the four photodetectors, then the power distribution of the local oscillator signal may be adjusted utilizing the polarization controller 720.

Figure 8:
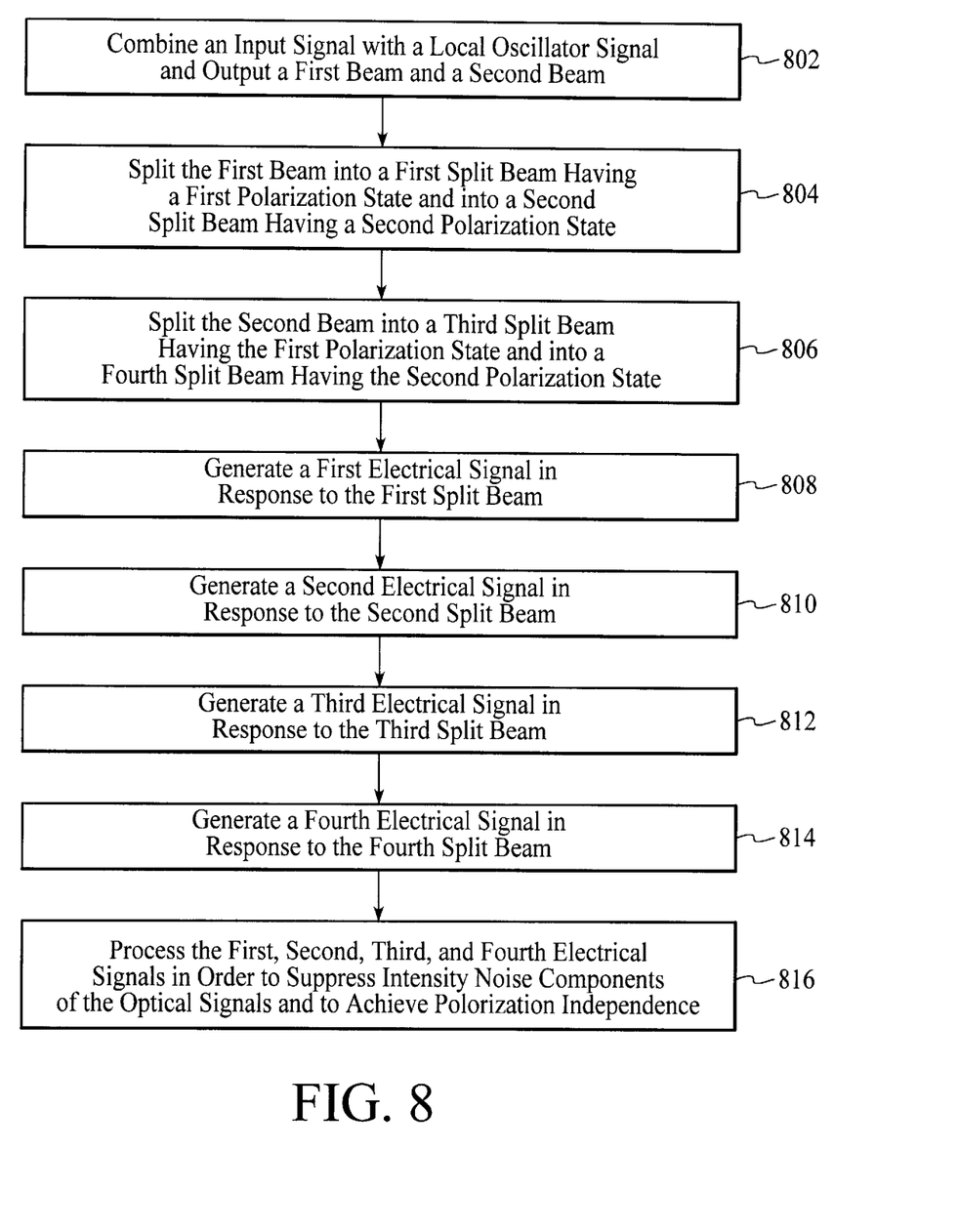
FIG. 8 is a process flow diagram of a method for monitoring an input signal utilizing optical heterodyne detection.

A method for monitoring an optical signal utilizing optical heterodyne detection is described herein and depicted in the process flow diagram of FIG. 8. In a step 802, an optical signal is combined with a local oscillator signal and a first beam and a second beam of the combined input signal and local oscillator signal are output. In a step 804, the first beam is split into a first split beam having a first polarization state and into a second split beam having a second polarization state. In a step 806, the second beam is split into a third split beam having the first polarization state and into a fourth split beam having the second polarization state. That is, the first split beam and the third split beam have the same polarization state and likewise, the second split beam and the fourth split beam have the same polarization state. In a step 808, a first electrical signal is generated in response to the first split beam. In a step 810, a second electrical signal is generated in response to the second split beam. In a step 812, a third electrical signal is generated in response to the third split beam. In a step 814, a fourth electrical signal is generated in response to the fourth split beam. In a step 816, the first, second, third, and fourth electrical signals are processed in order to suppress intensity noise components of the incoming beams and to achieve polarization independence.

Figure 9:
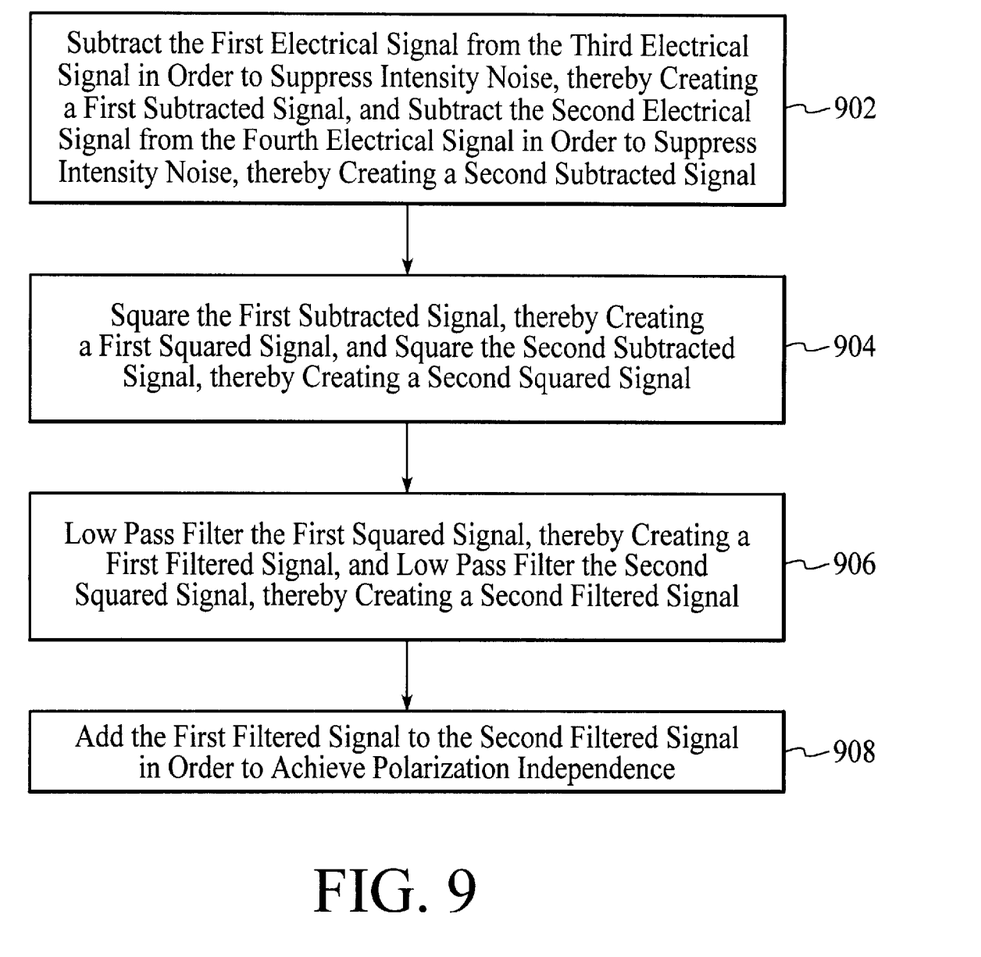
FIG. 9 is a process flow diagram of additional processing steps related to FIG. 8.

Details of the processing recited in step 816 of FIG. 8 are represented in FIG. 9. In a step 902, the processing involves subtracting the first electrical signal from the third electrical signal in order to suppress intensity noise, thereby creating a first subtracted signal, and subtracting the second electrical signal from the fourth electrical signal in order to suppress intensity noise, thereby creating a second subtracted signal.

In an additional step 904, the processing further involves squaring the first subtracted signal, thereby creating a first squared signal, and squaring the second subtracted signal, thereby creating a second squared signal.

In an additional step 906, the processing further involves low pass filtering the first squared signal, thereby creating a first filtered signal, and low pass filtering the second squared signal, thereby creating a second filtered signal.

In an additional step 908, the processing further involves adding the first filtered signal to the second filtered signal in order to achieve polarization independence.

What is claimed is:
1. A system for optical heterodyne detection comprising:
an optical coupler for combining an input signal and a local oscillator signal into a combined optical signal, said optical coupler having two outputs for outputting a first beam and a second beam of said combined optical signal;
polarizing beam splitter for splitting a beam based on its state of polarization, said polarizing beam splitter being optically connected to said two outputs of said optical coupler to receive said first beam and said second beam, said polarizing beam splitter having four outputs for outputting two polarized portions of said first beam and two polarized portions of said second beam;
first, second, third, and fourth photodetectors, each of said photodetectors being optically connected to receive a different one of said two polarized portions of said first beam and said two polarized portions of said second beam, said photodetectors generating electrical signals in response to respective ones of said four beams, and
a switch located in an optical path before said optical coupler for selectively blocking transmission of said input signal to said optical coupler.
2. The system of claim 1 further including a processor for providing an output signal in which the intensity noise component of said input signal is suppressed.
3. The system of claim 2 wherein said processor includes circuitry for providing said output signal in a manner which is substantially independent of the polarization of said input signal.

4. The system of claim 1 wherein:
said first photodetector corresponds to an ordinary portion of said first beam and generates a first one of said electrical signals;
said second photodetector corresponds to an extraordinary portion of said first beam and generates a second one of said electrical signals;
said third photodetector corresponds to an ordinary portion of said second beam and generates a third one of said electrical signals;
said fourth photodetector corresponds to an extraordinary portion of said second beam and generates a fourth one of said electrical signals;
said system further including a subtracting unit for:
sub­tracting said first one of said electrical signals from said third one of said electrical signals to create a first subtracted signal; and
subtracting said second one of said electrical signals from said fourth one of said electrical signals to create a second subtracted signal, in order to suppress intensity noise related to said input signal.

5. The system of claim 4 further including:
a squaring unit for squaring said first subtracted signal to create a first squared signal, and squaring said second subtracted signal to create a second squared signal; and
an adding unit for adding said first squared signal to said second squared signal to create an output signal that is independent of the polarization of said input signal.

6. The system of claim 5 further including a low pass filtering unit for low pass filtering said first squared signal before said first squared signal enters said adding unit, and low pass filtering said second squared signal before said second squared signal enters said adding unit.

7. The system of claim 1 wherein said polarizing beam splitter includes a walk-off crystal that is connected to receive said first beam and said second beam from said optical coupler.

8. The system of claim 1 wherein said optical coupler is substantially polarization independent.

9. The system of claim 1 further including first and second output fibers that optically connect said optical coupler and said polarizing beam splitter.

10. The system of claim 9 further including a lens for focusing said first beam and said second beam from said first and second output fibers to said polarizing beam splitter.

11. The system of claim 1 wherein transmission of said input signal is blocked by said switch in order to calibrate one of said optical coupler, said polarizing beam splitter, or said photodetectors.

12. A system for optical heterodyne detection comprising:
an optical coupler having a first input for receiving an input signal and a second input for receiving a local oscillator signal, said optical coupler having first and second outputs, wherein a first beam that includes said input signal and said local oscillator signal is output from said first output and wherein a second beam that includes said input signal and said local oscillator signal is output from said second output;
a polarizing beam splitter connected to receive said first beam from said optical coupler and to receive said second beam from said optical coupler, said polarizing beam splitter splitting said first beam into a first split beam having a first polarization state and into a second split beam having a second polarization state, said polarizing beam splitter splitting said second beam into a third split beam having said first polarization state and into a fourth split beam having said second polarization state;
a first photodetector connected to receive said first split beam having said first polarization state and to generate a first electrical signal in response to said first split beam;
a second photodetector connected to receive said second split beam having said second polarization state and to generate a second electrical signal in response to said second split beam;
a third photodetector connected to receive said third split beam having said first polarization state and to generate a third electrical signal in response to said third split beam;
a fourth photodetector connected to receive said fourth split beam having said second polarization state and to generate a fourth electrical signal in response to said fourth split beam;
a processor connected to receive said first, second, third, and fourth electrical signals, and
a switch located in an optical path before said first input of said optical coupler for selectively blocking transmission of said input signal to said optical coupler.

13. The system of claim 12 wherein said processor includes:
a subtraction unit for subtracting a value related to said first electrical signal from a value related to said third electrical signal, thereby creating a first subtracted value, and for subtracting a value related to said second electrical signal from a value related to said fourth electrical signal, thereby creating a second subtracted value;
wherein said subtraction unit suppresses intensity noise related to said first, second, third, and fourth split beams.

14. The system of claim 13 wherein said processor includes:
a squaring unit for squaring said first subtracted value, thereby creating a first squared value, and for squaring said second subtracted value, thereby creating a second squared value;
a low pass filtering unit for low pass filtering said first squared value, thereby creating a first filtered value, and for low pass filtering said second squared value, thereby creating a second filtered value; and
an adding unit for adding said first filtered value to said second filtered value;
wherein said squaring unit, said low pass filtering unit, and said adding unit create an output value that is independent of the polarization of said input signal.

15. The system of claim 14 wherein said polarizing beam splitter includes a birefringent walk-off crystal.

16. The system of claim 12 wherein said optical coupler and said polarizing beam splitter are integrated into a planar waveguide circuit.

17. A method for monitoring an optical signal utilizing optical heterodyne detection comprising steps of:
combining an input signal with a swept local oscillator signal and outputting a first beam and a second beam, said first beam including portions of said input signal and said swept local oscillator signal and said second beam including portions of said input signal and said swept local oscillator signal;
splitting said first beam into a first split beam having a first polarization state and into a second split beam having a second polarization state;
splitting said second beam into a third split beam having said first polarization state and into a fourth split beam having said second polarization state;

generating a first electrical signal in response to said first split beam;

generating a second electrical signal in response to said second split beam;

generating a third electrical signal in response to said third split beam;

generating a fourth electrical signal in response to said fourth split beam; and processing said first, second, third, and fourth electrical signals in order to suppress intensity noise components of said first, second, third, and fourth split beams and to achieve polarization independence.

18. The method of claim 17 wherein said step of processing includes steps of:

subtracting said first electrical signal from said third electrical signal in order to suppress intensity noise, thereby creating a first subtracted signal;

subtracting said second electrical signal from said fourth electrical signal in order to suppress intensity noise, thereby creating a second subtracted signal;

squaring said first subtracted signal, thereby creating a first squared signal;

squaring said second subtracted signal, thereby creating a second squared signal;

low pass filtering said first squared signal, thereby creating a first filtered signal;

low pass filtering said second squared signal, thereby creating a second filtered signal; and adding said first filtered signal to said second filtered signal in order to achieve polarization independence.

19. The method of claim 17 further including a step of switching said input signal off in order to calibrate an optical coupler as a function of wavelength, wherein said optical coupler combines said input signal with said swept local oscillator signal.

20. The method of claim 17 further including a step of switching said input signal off in order to calibrate the splitting ratio of the local oscillator signal as a function of wavelength.

21. The system of claim 12 wherein transmission of said input signal is blocked by said switch in order to calibrate one of said optical coupler, said polarizing beam splitter, and said photodetectors.

22. A system for optical heterodyne detection comprising:

an optical coupler for combining an input signal and a local oscillator signal into a combined optical signal, said optical coupler having two outputs for outputting a first beam and a second beam of said combined optical signal;

polarizing beam splitter for splitting a beam based on its state of polarization, said polarizing beam splitter being optically connected to said two outputs of said optical coupler to receive said first beam and said second beam, said polarizing beam splitter having four outputs for outputting two polarized portions of said first beam and two polarized portions of said second beam;

first, second, third, and fourth photodetectors, each of said photodetectors being optically connected to receive a different one of said two polarized portions of said first beam and said two polarized portions of said second beam, said photodetectors generating electrical signals in response to respective ones of said four beams, and a digital signal processor for providing an output signal in response to said electrical signals in which the intensity noise component of said input signal is suppressed.

23. The system of claim 22 wherein:

said first photodetector corresponds to an ordinary portion of said first beam and generates a first one of said electrical signals;

said second photodetector corresponds to an extraordinary portion of said first beam and generates a second one of said electrical signals;

said third photodetector corresponds to an ordinary portion of said second beam and generates a third one of said electrical signals;

said fourth photodetector corresponds to an extraordinary portion of said second beam and generates a fourth one of said electrical signals;

said digital signal processor further including logic for:

subtracting said first one of said electrical signals from said third one of said electrical signals to create a first subtracted signal; and subtracting said second one of said electrical signals from said fourth one of said electrical signals to create a second subtracted signal, in order to suppress intensity noise related to said input signal.

24. The system of claim 23 wherein said digital signal processor further includes logic for:

squaring said first subtracted signal to create a first squared signal, and squaring said second subtracted signal to create a second squared signal; and adding said first squared signal to said second squared signal to create an output signal that is independent of the polarization of said input signal.

25. The system of claim 24 wherein said digital signal processor further includes logic for low pass filtering said first squared signal before adding said first squared signal to said second squared signal, and low pass filtering said second squared signal before adding said second squared signal to said first squared signal.

* * * * *